United States Patent [19]

Deeg et al.

[11] 4,076,542
[45] Feb. 28, 1978

[54] PROCESS FOR PRODUCING PHOTOCHROMIC SILICATE GLASS FILM CONTAINING SILVER HALIDE PARTICLES

[75] Inventors: Emil W. Deeg, Woodstock, Conn.; Donald O. Hoffman, Sturbridge, Mass.

[73] Assignee: American Optical Corporation, Southbridge, Mass.

[21] Appl. No.: 692,938

[22] Filed: Jun. 4, 1976

[51] Int. Cl.$^2$ ............................................. C03C 21/00
[52] U.S. Cl. ..................................... 106/52; 65/30 R; 65/31; 65/DIG. 2; 106/54; 106/DIG. 6; 252/300; 350/359; 427/162; 427/166; 428/432
[58] Field of Search ..................... 106/DIG. 6, 52, 54; 65/DIG. 2, 30, 31

[56] References Cited

U.S. PATENT DOCUMENTS

| | | | |
|---|---|---|---|
| 2,366,516 | 1/1945 | Geffcken et al. | 427/165 |
| 3,208,860 | 9/1965 | Armistead et al. | 106/DIG. 6 |
| 3,449,103 | 6/1969 | Stookey | 106/52 |
| 3,767,432 | 10/1973 | Thomas | 106/52 |
| 3,767,434 | 10/1973 | Thomas | 106/52 |
| 3,875,321 | 4/1975 | Gliemeroth et al. | 106/DIG. 6 |
| 3,876,436 | 4/1975 | Lythgoe | 106/DIG. 6 |

OTHER PUBLICATIONS

Dislich, H. "Preparation of Multicomponent Glasses Without Fluid Melts" Glastech Ber 44, (1971), No. 1, pp. 1-8.
Schroeder, "Physics of Thin Films"-Ed. Hass & Thun, Academic Press, vol. 5, (1969) pp. 87-141.
Christie, W. W. "The Structures of Bile Phosphctiidyl-citolines" Biochimica et Biophysica Acta, 316, (1973), pp. 204-211.
Hubbell, W. L., et al., "Molecular Motion in Spin-Labeled Phospholipids and Membranes" J. Amer. Chem. Soc., 93(2), Jan. 27, 1971.

*Primary Examiner*—Helen M. McCarthy
*Attorney, Agent, or Firm*—Kenway & Jenney

[57] ABSTRACT

A process for producing a photochromic silicate glass film is disclosed which is characterized by the steps of forming a solution containing silver ions and a film-forming silicate monomer in a solvent common to both, removing the solvent from the solution to produce a discreet film or a film coating on an article, and exposing the formed film to a source of halide ions to form fine silver halide particles within the film.

8 Claims, No Drawings

PROCESS FOR PRODUCING PHOTOCHROMIC SILICATE GLASS FILM CONTAINING SILVER HALIDE PARTICLES

BACKGROUND OF THE INVENTION

This invention relates to silver halide based, photochromic, silicate glass film, and more particularly to a process for producing such films from known film-forming silicate materials such as tetraethylorthosilicate.

Photochromic substances undergo a spontaneous reversible color change on exposure to and removal from activating electromagnetic radiation. For example, a photochromic substance which is transparent and normally colorless will, upon irradiation, turn dark, the degree of darkening being dependent upon the particular substance employed and the degree of irradiation. The basis of the photochromic reaction is that photochromic substances, e.g., silver halides, can undergo a chemical change wherein species are produced which absorb visible light to a considerably greater degree than the silver halide salts. However, the very essence of photochromism requires that this reaction be reversible so that the substance can regain its light transmissive state after removal of the activating radiation.

It is believed that the only successful silver halide based photochromic materials are those in which fine particles of photosensitive silver halides are isolated in the transparent glass matrix so that the reaction products are trapped within a microscopic environment where they are available for recombination. One successful material comprises a photochromic glass which may be produced by forming silver halide crystals in a molten glass matrix and thereafter allowing the glass to cool in a mold. U.S. Pat. No. 3,208,860 to W. H. Armistead et al. discloses a method of producing a photochromic glass comprising melting a batch of silicate glass containing a silver halide, e.g., silver chloride, silver bromide, silver iodide, or mixtures thereof, to produce a melt containing at least one silver halide species. Thereafter, the melt is cooled to form a glass article and heat treated at a temperature between the strain point and softening point of the glass for a time sufficient to produce a second phase therewithin. On cooling, the second phase crystalizes, and a photochromic glass article results.

The instant invention provides another method of forming glass articles which are characterized by photochromic properties similar in many respects to those of the Armistead et al. patent mentioned above.

SUMMARY OF THE INVENTION

The process of the instant invention produces photochromic silicate glass. A light sensitive solution is prepared by mixing a film forming silicate, e.g., tetraethylorthosilicate, and a source of silver ions, e.g., silver nitrate, together in a solvent capable of dissolving both, e.g., low molecular weight alcohols or water. A quantity of this solution is then poured into a mold and the solvent is removed, for example by suction or heat induced evaporation, to form a silver ion impregnated silicate glass film. Thereafter, the film is exposed to halogen ions such as chloride, bromide, or iodide by contacting it with a halide containing vapor, e.g., an acid halide containing gas. When the halide diffuses into the film, silver halide particles which exhibit photochromic behavior are formed therewithin.

Preferably, the film-forming solution will also contain copper or other ions which, as is known, can act to sensitize the silver halide crystals.

Accordingly, it is an object of the invention to provide a method for producing photochromic silicate glass films.

Another object of the invention is to provide such a method which avoids the necessity of heat treatment.

Another object of the invention is to provide a process for producing silicate glass photochromic articles which can be made from a wide variety of film-forming silicate materials such as tetraethylorthosilicate, phosphorosilicates, and borosilicates.

Still another object of the invention is to provide silver halide based photochromic silicate glass films which may be used independently or as a coating on transparent materials.

Other objects and features of the invention will be apparent from the following description of a preferred embodiment.

DESCRIPTION OF THE PREFERRED EMBODIMENT

At the outset, the invention is described in its broadest overall aspects with a more detailed description following.

The instant invention provides a method of forming a photochromic silicate glass film for use either independently or as a coating on other glass materials. The matrix carrying the photochromic particles is a silicate matrix formed from film forming monomers utilizing processes known in the literature. See, for example, the publication entitled *COLLOIDAL SILICA* by R. K. Iler, in Surface and Colloidal Science, edited by Egon Matijevic, Volume VI, 1973.

The first step in the process is to prepare a solution containing a film forming silicate and silver ions in a solvent common to both. Low molecular weight alcohols such as ethyl alcohol, tertiary butyl alcohol, etc. are well suited solvents for this purpose. Water may be used in some cases. The film forming silicate materials useful in the process of the invention are of the type which, under suitable conditions, polymerize to form translucent or, preferably, transparent materials and are well known to those skilled in the art. Suitable film forming silicates are available, for example, from the Emulsitone Co., Whippany, New Jersey, under tradenames such as Silicafilm, Phosphorosilicafilm, and Borosilicafilm. The most convenient source of silver ions is silver nitrate, but other sources of silver ion such as ammonia complexed silver ions may be used if desired. In addition to the above two ingredients, the solution may also comprise an acid or base as may be required to enhance solubility of the components, and may also contain a small amount of an ion such as $Cu^+$ which, as known, is capable of sensitizing silver halides to the reversible, light induced chemical change desired. Other useable ions, which in general may be included in the film to replace up to about 50 percent of the silver ion present, include $Li^+$, $Na^+$, $K^+$, $Rb^+$, $Cs^+$, $Tl^+$, $Ca^{++}$, $Mg^{++}$, $Sr^{++}$, $Ba^{++}$, $Zn^{++}$, $Be^{++}$, and mixtures thereof. Preferred activating ion are $Cu^{++}$, $Fe^{++}$, $Cd^{++}$, and $S^=$ ions which preferably replace about 10 ion percent of the silver ion present. The film forming solutions made as indicated above are light sensitive and should preferably be stored in the dark at low temperatures.

The next step of the process is to transfer a quantity of the solution prepared as disclosed above to a mold or to the surface of a material which is desired to be coated. Thereafter, the solvent is removed to form a film of silicate glass. The solvent may be removed by applying heat to the solution to evaporate the solvent, by vacuum techniques, or by other techniques known to those skilled in the art.

In the next step of the process, the film is contacted with halide ions such that the halide ions penetrate the porous film and combine with the silver ions trapped therein to form fine silver halide crystals. The preferred method of contacting a halide with a film is to expose the film to the vapors of concentrated hydrochloric, hydrobromic, or hydriodic acid, in a desiccator, for a sufficient amount of time to accomplish the desired reaction. While the duration of this reaction will depend upon the porosity of the silica film and the thickness thereof, periods of time ranging from 1 to 3 hours will generally be sufficient. The halide ions have been observed to penetrate the silica film by diffusion, usually to a depth of about 150 microns. Accordingly, a 300 micron photochromic film having an essentially homogeneous distribution of silver halide therethrough may be manufactured by the process of the invention by exposing both sides of the film to halide ions. Thicker articles will have a photochromic layer to a depth of approximately 150 microns on their surface.

This process produces articles which, on irradiation, darken to a blue-purple color. On removal of the activating radiation, the article regains its original color at room temperature (20° C). At temperatures above 20° C, the rate of recovery decreases, i.e., it takes a longer period of time for the article to attain its original color. The rate of recovery after irradiation depends, in addition to the temperature of the article, on the size of the silver halide particles (larger particles, longer cycles) and the concentration of sensitizing ions.

The invention will be further understood from the following non-limiting examples.

EXAMPLE 1

A solution was prepared by mixing 2 ml of 40% nitric acid, 2 ml of 0.1 M silver nitrate, 0.5 ml of 0.1 M cupric nitrate, and 20 ml of ethyl alcohol. The mixture was stirred to form a homogeneous solution and thereafter mixed with a solution comprising 4 ml of tetraethylorthosilicate, 8 ml of tertiary butyl alcohol, and 6 ml of ethyl alcohol. The resulting solution was light sensitive and was kept in a covered container in a refrigerator prior to use.

Approximately 3 ml. of the above described solution was transferred to an open, glass Petri dish, 90 mm in diameter, and evaporated to dryness in an oven at 70° C. The resulting thin film (approximately 5 mm thick) was then enclosed in a desiccator over concentrated hydrochloric acid for 2 hours to produce fine particles comprising AgCl containing crystals.

On irradiation for about 4 minutes with a hand-held ultraviolet light source, the film darkened to a blue-purple color. When the ultraviolet light impinging on the film was removed and the film was left to stand at room temperature, it became increasingly translucent until it substantially regained its original color, indicating that the light induced chemical reaction was reversible.

EXAMPLE 2

The procedure of Example 1 is repeated except that a film forming silicate sold under the tradename Silicafilm by the Emulsitone Company is substituted for the tetraethylorthosilicate. Film produced by the method of this example exhibits a degree of photochromism similar to that of Example 1.

EXAMPLE 3

The procedure of Example 1 is repeated except that a phosphorosilica film-forming silicate (Phosphorosilicafilm, Emulsitone Co.) is substituted for the tetraethylorthosilicate. The film produced by this process exhibits a degree of photochromism similar to that of Example 1.

EXAMPLE 4

The procedure of Example 1 is repeated except that a borosilicate film-forming solution (Borosilicafilm, Emulsitone Co.) is substituted for the tetraethylorthosilicate. The film produced by the procedure of this example exhibits photochromic properties similar to the film of Example 1.

EXAMPLE 5

Three ml of the solution prepared in Example 1 was placed in a 90 mm diameter Petri dish and exposed to HCl fumes in a desiccator for approximately 15 seconds prior to solvent removal. A slightly hazy solution developed which, on evaporation to dryness in an oven at 65° C, formed a slightly hazy transparent film having AgCl particles uniformly dispersed therethrough as determined by microscopic examination. A two minute exposure to sunlight resulted in a blue-purple coloration which significantly diminished when the film was repositioned out of the direct sunlight. This example indicates that the exposure to the halide may take place either before or after polymerization of the matrix.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A process for producing photochromic silicate glass films, said process being characterized by the steps of:
   1. preparing a light sensitive solution comprising a film forming silicate, silver ions, and a suitable solvent;
   2. removing the solvent from said solution to form a silver ion impregnated silicate glass film; and
   3. exposing the silicate to the vapors of halogen ions selected from the group consisting of chloride, bromide, iodide, and mixtures thereof to produce photochromic silver halide particles in said film.

2. The process as set forth in claim 1 wherein step 3 is effected by exposing said film to the vapor of an acid selected from the group consisting of HCl, HBr, HI, and mixtures thereof.

3. The process as set forth in claim 1 wherein the film-forming silicate is selected from the group consisting of tetraethylorthosilicate, phosphorosilicate, and borosilicate.

4. The process as set forth in claim 1 wherein said solution further contains copper ions for sensitizing the silver halide particles produced to light induced reactions.

5. The process as set forth in claim 1 wherein said solution further contains an ion selected from the group consisting of $Li^+$, $Na^+$, $K^+$, $Rb^+$, $Cs^+$, $Tl^+$, $Ca^{++}$, $Mg^{++}$, $Sr^{++}$, $Ba^{++}$, $Zn^{++}$, $Be^{++}$, $Fe^{++}$, $Cd^{++}$, $S^=$, and mixtures thereof.

6. The process as set forth in claim 1 wherein the solvent is removed by heat induced evaporation.

7. The process as set forth in claim 1 wherein said solvent is selected from the group consisting of water, low molecular weight alcohols, and mixtures thereof.

8. The process as set forth in claim 1 wherein said exposing step is effected prior to removing said solvent.

* * * * *